United States Patent
Ellis

(10) Patent No.: US 7,407,610 B2
(45) Date of Patent: Aug. 5, 2008

(54) LITTER FOR ANIMALS OTHER THAN DOMESTIC CATS

(76) Inventor: Doug E. Ellis, 6960 Salashan Pkwy., Ferndale, WA (US) 98248

( * ) Notice: Subject to any disclaimer, the term of this patent is extended or adjusted under 35 U.S.C. 154(b) by 0 days.

(21) Appl. No.: 11/383,170

(22) Filed: May 12, 2006

(65) Prior Publication Data

US 2007/0022965 A1     Feb. 1, 2007

Related U.S. Application Data

(63) Continuation of application No. 10/269,012, filed on Oct. 9, 2002, now abandoned, which is a continuation of application No. 09/809,895, filed on Mar. 15, 2001, now abandoned.

(60) Provisional application No. 60/189,707, filed on Mar. 15, 2000.

(51) Int. Cl.
*A01K 29/00* (2006.01)
*B29B 9/02* (2006.01)

(52) U.S. Cl. .................. 264/117; 264/118; 264/122; 119/171; 119/172; 119/173

(58) Field of Classification Search ............... None
See application file for complete search history.

(56) References Cited

U.S. PATENT DOCUMENTS

| 4,157,696 A | 6/1979 | Carlberg |
| 4,263,873 A | 4/1981 | Christianson |
| 4,560,527 A * | 12/1985 | Harke et al. ............... 264/500 |
| 4,621,011 A | 11/1986 | Fleischer et al. |
| 4,676,196 A | 6/1987 | Lojek et al. |
| 4,944,247 A | 7/1990 | McNish et al. |
| 5,091,245 A | 2/1992 | Phillips |
| 5,209,186 A * | 5/1993 | Dewing ..................... 119/172 |
| 5,352,780 A * | 10/1994 | Webb et al. ................. 536/56 |
| 5,358,607 A | 10/1994 | Ellis |
| 5,415,131 A | 5/1995 | Dodman |
| 5,609,123 A * | 3/1997 | Luke et al. .................. 119/173 |
| 5,728,270 A * | 3/1998 | Knapick et al. ............. 162/189 |
| 6,276,300 B1 * | 8/2001 | Lewis et al. ................. 119/172 |

* cited by examiner

*Primary Examiner*—Mary Lynn Theisen
(74) *Attorney, Agent, or Firm*—Michael F. Hughes; Hughes Law Firm, PLLC

(57) ABSTRACT

Particulate absorbent materials having a size and bulk density range that is conducive to provide a litter for animals that do not bury their eliminations. Where the granular material is sufficiently large and dense to not be discharged from a bin containing the granular material. Each granule has a smooth exterior that will not hang on to the hair or hide of the animal discharging their eliminations. Furthers the granules are of sufficient size and weight to not get stuck in the footing of the animal. The preferred characteristics of the material is having a width of 6 mm-12 mm and having an aspect ratio substantially between 1-1 and 1-6 where the granular substance has a bulk density greater than 12 pounds per cubic foot.

20 Claims, 1 Drawing Sheet

LITTER FOR ANIMALS OTHER THAN DOMESTIC CATS

RELATED APPLICATIONS

This application claims priority of U.S. Provisional Application Ser. No. 60/189,707, filed Mar. 15, 2000, and is further a continuation of U.S. patent application Ser. No. 09/809,895, filed on Mar. 15, 2001 now abandoned and is further a continuation of U.S. Ser. No. 10/269,012 filed Oct. 9, 2002 now abandoned.

FIELD OF THE INVENTION

The present invention relates to the general field of animal litter products, and more particularly such product which would be particularly adapted for use by animals, such as dogs or other animals that do not bury there eliminations which are small to large in size. The presented invention generally also relates to absorbent materials and for the manufacturing thereof and more particularly, absorbent particulate of a size notably larger than what those skilled in the art produce.

BACKGROUND

Absorbent particulate has been produced in a small-granulated form where as the average particle size is generally less than 3 mm in diameter and in most every case less than 6 mm in diameter. Traditional applications for particulate absorbents produce a small size to increase the surface area for absorption and to make the product appear more like coarse sand to fine gravel. Several manufacturers of organic absorbent particulate manufacture pellets up to 6 mm in diameter. These larger pellets are essentially used as cat litters.

For many decades, cat litter has been sold as a product for use in households. Quite commonly this is made up of sand like particulate matter with an average particle size of less than three millimeters. However, this has proven unsuitable for medium sized to larger dogs and other animals. Further, to the best knowledge of the Applicant herein, even though there has been a need for a similar product for dogs or other animals that do not bury their elimination, no satisfactory product has been developed. The available particulate products tended to be tracked by the dogs in the household. Further, the movements of the dog in or around the litter box tends to scatter the granulate.

As mentioned above, absorbent particulate used as cat litter is been produced in a small-granulated form where as the average particle size is generally less than 3 mm in diameter and in most every case less than 6 mm in diameter. Traditional applications for particulate absorbents produce a small size to increase the surface area for adsorption and to make the product appear more like coarse sand to fine gravel. The small size also helps to coat and dehydrate feces, which quickly reduces the odors and allows for easier removal. Several manufactures of organic absorbent particulate manufacture extrude pellets from 3 mm to 6 mm in diameter. In some forms, these pellets are cracked into smaller angular pieces. These pellets are essentially used as cat litters.

The use of these traditional absorbents and litter materials as a large animal litter, in particular a dog litter, presents several problems. Differences in behavior patterns among species such as sniffing and scratching the area makes dustiness a concern with many traditional small sized litters.

Foot pad size and shape of animals such as dogs along with foot pad spreading habits can allow small particulate to become lodged in the pad inducing tracking from the litter box. Animals such as dogs often have a tendency to rapidly paw the area under them before and after eliminating. Larger sized litter material reduces the spreading of materials caused by this action.

Cats instinctively dig to cover their eliminations. Cat litters are usually produced in a size range to facilitate this digging and covering process. Many larger animals including dogs do not naturally dig and cover their waste. As a result the smaller particle size is not needed to facilitate this action where as a larger particle size is desirable to reduce spreading and tracking.

The prior art large animal litter, particularly for use as a dog litter, consisted of a soft paper based material resembling a corn flake sized and shaped piece of shredded paper egg crate. Dogs readily accepted the product but its lightweight allowed for significant spreading and its tattered edges allowed for substantial clinging to the fur of animals.

It has been found that the product that is subject to this invention can be used in a household by placement in an open box having lateral dimensions of an adequate size so the dog can move around the same. It has been found that the surface provided by this litter product is acceptable to the dog in that the dog will walk on top of it without any discomfort. The pellets are sized so that these do not become stuck in the dog's paws; nor do they stick to the dogs fur. Further, with the size and density within these ranges, in large part the litter product is not scattered outside the box.

The large sized absorbent particulate where in the absorbent particles are notably larger than traditional inorganic and organic absorbents, are substantially free of protruding edges, are of a bulk density sufficient to minimize scattering and are suitable for use as a litter in direct contact with animals such as house bound dogs. Further, the large sized absorbent particulate lack angular ends which can be uncomfortable for animals other than cats.

BACKGROUND ART

A search of the patent literature has a number of patents directed toward these problems, these being the following:

U.S. Pat. No. 4,263,873 refers to a cellulose litter that contains a Pheromone like attractant with a consistency of fine gravel. This litter had a density in excess of 5-6 pounds per $ft^3$ and was not specifically tailored to the needs of larger animals such as dog.

U.S. Pat. No. 5,415,131 also refers to the use of pheromones as an attractant to domesticated animals including dogs. However it does not address the physical size, shape, and density needs as outlined in this invention.

U.S. Pat. No. 4,676,196 discloses a biodegradable absorbent material for letter comprising ingredients including a solid nonfibrous order control material, a member of the group of dried alfalfa, cement, a binder and a density control agent.

U.S. Pat. No. 4,621,011 and discloses a cellulosic particle for a litter and a method of making the same. Although this application discloses making a litter from waste material, the product does not recite the intended use as recited herein.

U.S. Pat. No. 5,091,245 discloses a degradable absorbent material using waste cellulose fiber and a low bulk density.

U.S. Pat. No. 5,358,607 discloses a degradable particulate absorbent having inorganic solids.

U.S. Pat. No. 4,944,247 discloses an animal litter product comprising absorbent that is made by a byproduct of a Bayer process residue.

U.S. Pat. No. 4,157,696 discloses a cellulose fiber material to provide absorbing pellets using industrial or agricultural waste products to make the pellets. The disclosure does not disclose the dimensional characteristics of the resulting pellets.

The prior art fails to show a granular substance that is adapted to be used for an animal that does not bury their feces where as the product of this invention is of a larger particle size than fine gravel and is and has a bulk density substantially above 5-6 pounds per $ft^3$.

SUMMARY OF THE INVENTION

The invention comprises an animal litter adapted to be used for animals that the numbering their eliminations (feces). The litter comprises a granular substance having a granular width between 6 mm-12 mm. The invention further has an aspect ratio defined herein below) between 1-1 and 1-6. The granular substance has a bulk density in the preferred range greater than 12 pounds per cubic foot.

More specifically the product of the invention is produced to fit the indoor bathroom needs of animals such as a small dog. Whereas the absorbent material needs to be of a size and density sufficient enough to reduce tracking and spreading, be highly absorbent, be free from outward protruding edges that may hang on in the animals fur, and be safe for contact with the animals.

Additional environmental enhancement applications for the invention such as reptile cage and exotic bird liners along with primate cages and other exotic species.

DETAILED DESCRIPTION OF THE PREFERRED EMBODIMENT

Figure 1:
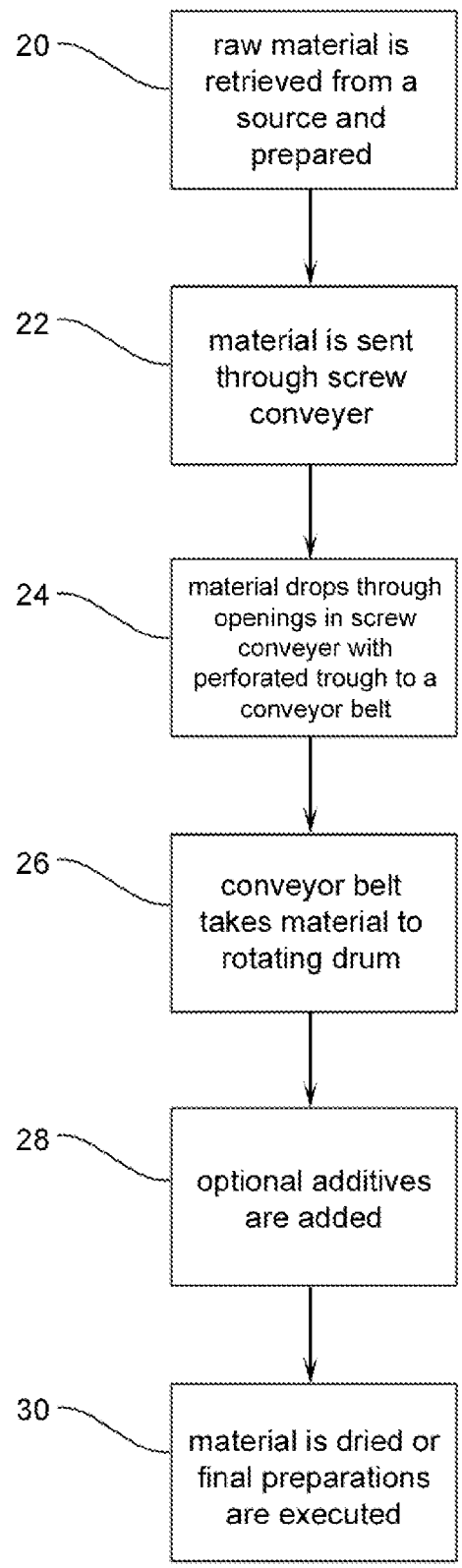
FIG. 1 is a schematic flow diagram showing a preferred manufacturing process for producing the material granular of the present invention.

The product of the present invention comprises large sized absorbent particulate where in the absorbent particle is notably larger than traditional clay and organic absorbents, is substantially free of protruding edges, is of a density sufficient to minimize scattering, lodging in the paws of animals and sticking to the animals fur.

The present invention generally relates to absorbent materials and for the manufacturing thereof and more particularly, absorbent particulate of a size notably larger than what those skilled in the art produce. The absorbent particulate is characterized as being in excess of 6 mm in diameter and preferably in the 8 mm to 10 mm range. The width is the portion of any cross section that prevents the granular from falling through a screen having openings at the prescribed width. The granulars have an aspect ratio (maximum length to minimum width) of between 1 to 1 and 8 to 1, is substantially free of protruding edges, has a bulk density of between thirteen and fifty pounds per cubic foot and preferably in the twenty to thirty pound per $ft^3$ range, have a minimum absorption ratio (amount of liquid absorbed compared to the weight of the granulars) of 0.5 to 1 and preferably a minimum of 1 to 2 times its weight.

The large sized absorbent may be made of inorganic materials such as clay, diatomaceous earth, calcium compounds, gypsum; organic materials such as cellulose fiber; paper, sawdust, plant hulls; synthetic materials such as Silica beads, mining byproduct, kiln byproduct or any combination thereof and further in the broader scope any absorbent material would suffice. In the preferred form a waste byproduct is a preferred product because of its economic availability. The short fiber pulp waste pulp byproducts physical characteristics described further herein is a desirable base material. The addition of surfactants, absorbent jells, clumping agents, odor-controlling agents, scenting and animal attractants may be added to the product to enhance its physical, appearance or desired performance characteristics. These additives are commonly added to traditional absorbent materials and known to those skilled in the art of absorbent manufacturing.

The absorbent particulate is characterized as having an average volume in excess of 0.2 cc, with an aspect ratio of between 1 to 1 and 8 to 1, and being substantially free of protruding edges, have a bulk density of between thirteen and fifty pounds per cubic foot and preferably in the twenty to thirty pound per $ft^3$ range and have a minimum absorption ratio of 0.5 and preferably in the range of 1 to 2 times its weight. Although a higher bulk density of the granulars is desirable to reduce scatter, the cost of transportation, marketing, transportation, and disposal and handling is desirable to have a bulk density between 12-40 lbs. Per cubic foot of granulars where 18-25 lbs. per cubic foot is a most desirable range.

As mentioned above the large sized absorbent may be made of inorganic materials such as clay, diatomaceous earth, calcium compounds, gypsum; organic materials such as cellulose fiber; paper, sawdust, plant hulls; synthetic materials such as Silica beads or any combination thereof. The addition surfactants, absorbent jells, clumping agents, odor controlling agents, scenting and animal attractants may be added to the product to enhance its physical appearance or desired performance characteristics. These additives are commonly added to traditional absorbent materials and known to those skilled in the art of absorbent manufacturing.

More specifically, the product of the invention is produced to fit the indoor bathroom needs of animals such as a small or large dog. Where as the absorbent material needs to be of a size and density sufficient enough to reduce tracking and spreading, be highly absorbent, be free from outward protruding edges that may hang on in the animals fur, and be safe for contact with the animals.

Additional environmental enhancement applications are for but not limited to the invention such as rabbits, reptile cage and exotic bird liners along with primate cages and other exotic species. Industrial applications include: treated with an oilopphillic, hydrophobic surfactant oil only absorbent—oily water polisher. In agricultural—hydroponics the particulate slows release nutrient carrier pesticide carrier.

The preferred material the granulars are composed of is a cellulose fiber; specifically a short fiber from a pulp mill broken into pieces that are suitable to rule out put it to a sizing screw which breaks it up until it is to a predetermined size. A preferred material is waste short fiber from paper mills, high organic content, where recycled fiber is preferred because it is generally waste product and economical to acquire. The fiber feels like a clay substance when in a moist date and has a clay like consistency.

The preferred method of manufacture includes the steps shown in FIG. 1. The raw materials are slurried where additives and pH adjustments are made. The preferred pH is between the 4 to 5 range. The materials is then de-watered in a de-watering device such as a belt press or a screw press. This process can be done at the paper mill for a waste paper material or alternatively can be done on-site at the manufacturing facility. Further, the slurry can be cleaned to be removed from large particulate matter and other undesirable products contained therein (20). The pulp waste material retrieved and is fed a proportional feeder into a screw type sizing conveyor with 5/8 inch holes in the conveyor 22 and the product is reduced to adequate size. The preferred method making is to get the proximate volume of the particulate matter to the screw conveyer. The moisture of the substance comprising the granular is around 78 percent in the preferred form. Depending upon fiber length and organic content the moisture content can very. The high organic fillers (such as paper fillers which are typically calcium and kaolin clay) less moisture that is needed. With fifty percent organic material the moisture content can be proximally 65 percent.

The pre-conglomerated granular falls to a conveyor belt 24 and passes on into the 30 foot long rotating drum (26) that is at a slight decline to advance the granular as it rotates. The conglomerator substantially rounds out and the protruding edges in corners of the granular. When the product is rolled within the drum into a substantially spherical balls, additives can be added at this point such as surfactants and/or wetting agents, order control, and metal salts to control ammonia such as aluminum sulfate, copper sulfate and other ammonia controllers (28). Also at stage 28, optional coatings could be applied that may have benefits such as order control or appearance. The coating further could create a smooth exterior that inhibits the particulate from hanging onto the fur of the animal and aid in the rolling process to make the granular is roll up better. A lighter colored particulate is more readily accepted in the marketplace.

Finally the material is sent to a rotary drier 30. Hyle rotary dryers are used after the particulate exits the rotating drum. Fluid the dryers and belt dryers have also been successful and drying the product. However, the rotary dryers are preferred because they continue to roll and conglomerate product (i.e. remove the protruding edges and extending fibers from each granular piece).

Mine slag, silica gel, a wide variety of absorbing materials with the aforementioned density and size characteristics would function in the broader scope of the present invention.

One of the possible additives is a pheromone attractant. Pheromones are chemical substances as used for communication between is individual members of the same species; and which act as intraspecific chemical messengers perceived primarily by the olfactory sense and to a lesser extent, the gustatory sense of the living animal. The present invention therefore may employs a pheromone which is a "releaser" and is either a sex attractant, a trial marker, a territorial marker, or an aphrodisiac for the animal. Any number of animal attractants can be added to the granulate during manufacture or applied thereto in the household (e.g. by spraying it on with an aerosol can).

EXAMPLES

Example # 1

The first example includes a substantially rounded cellulose based product was produced using waste De-inked paper sludge and rolling it into a substantially spherical shaped ball. Drying the product in a rotary dryer, screening the product on a 6.4-mm opening screen adding an animal attracting liquid as provided by Westwood Laboratories, Azusa Calif. under the name of PU0590 at the rate of 600 to 1 (0.166% by weight).

The resulting gray colored product had a bulk density of 22 pounds per cubic foot, was a rounded pellet shape with smooth sides, had a soft texture similar to that of a pulp based folding egg crate and had an absorption ratio in the 1.2 to 1 range. Water and urine were rapidly absorbed. The product maintains its basic physical size, shape and integrity when saturated with water or urine without breaking down, resists attrition, and does not stick to the bottom of the litter tray when saturated.

Puppies and small dogs were trained to use the product. The soft texture appeared to be readily accepted in comparison to the hard angular materials produced from pellets and granular silica gel. Tracking was minimal and clinging to fur was not a problem.

Example #2

The second example employed rounded cellulose-based product as produced using waste paper mill sludge from a coated fine paper mill. The product was produced by breaking up the sludge and sizing it in sizing conveyor, rolling the resulting particles into spiracle shaped balls in a in a drum agglomerate, drying the resulting agglomerate, then screening the resulting product on a 6.4 mm screen.

The resulting off white material had a bulk density of 30 pounds per cubic foot, was a rounded pellet shape with smooth sides, had a semi hard texture and had an absorption ratio in the 0.84 to 1 range. Water and urine were absorbed by the product. The product maintains its basic physical size, shape and integrity when saturated with water or urine without breaking down, resists attrition, and does not stick to the bottom of the litter tray when saturated.

The heavier density reduced tracking and consumers were more receptive to the lighter off white color. The heavier density added to unit cost per volume in both production costs and transportation.

Example #3

The third example has rounded cellulose-based product as produced using waste paper mill sludge from a tissue mill. The product was produced by breaking up the sludge and sizing it in sizing conveyor, rolling the resulting particles into spherical shaped balls in a in a drum agglomerate, drying the resulting agglomerate, then screening the resulting product on a 6.4 mm screen.

The resulting off white material had a bulk density of 18 pounds per cubic foot, was a rounded pellet shape with smooth sides, had a soft texture similar to that of a pulp based berry crate and had an absorption ratio in the 1.3 to 1 range where water and urine were absorbed. The product maintains its basic physical size, shape and integrity when saturated with water or urine without breaking down, resists attrition, and does not stick to the bottom of the litter tray when saturated. The addition of pheromones and odor control additives were tested but not deemed essential to the product performance as a litter.

The soft texture and higher absorption rates were preferable to the first two examples. The lighter density tracked slightly more than example #2; however, there is a benefit of ease of handling and reduced costs to balance the marginal additional tracking problems. This configuration was preferable to all other examples.

Example #4

The fourth example provided a tubular cellulose based product as produced using waste de-inked paper mill sludge from a re-cycle mill. Drying the sludge and putting it through a pellet mill with ½ inch diameter die openings produced the product.

The resulting pellets ranged between 3/8 inch long and 1 7/8 inches long and 1/2 inch diameter. The granules had a hard smooth outer surface along the diameter and rough angular ends. The pellets were dark a gray material with a bulk density of 34 pounds per cubic foot resembling short thick pieces of black board chalk. They had an absorption ratio in the 0.85 to 1 range, very slowly absorbing water and urine and swelling in the process. The product maintains its basic physical size, shape but lost its integrity when saturated with water or urine and did not stick to the bottom of the litter tray when saturated.

The hard texture and slow absorption rates were undesirable compared with the first three examples. The large size and heavy density significantly reduced tracking compared with all other examples. The large hard pieces with angular ends were thought to be uncomfortable for many dogs there for adding to training difficulties. This configuration was not as preferable to other examples, but is within the broader scope of the invention to the extent of limitations of as recited by the claims below.

Example #5

The fifth example had a tubular cellulose based product as produced using fibrous agricultural products. The product was produced by putting dried fibers through a pellet mill with 5/16-inch diameter die openings.

The resulting pellets ranged between 1/4 inch long and 1 3/8 inches long and 6/16-inch diameter have a hard smooth outer surface along the diameter and rough angular ends. The pellets were dark a gray material with a bulk density of 42 pounds per cubic foot resembling short thick pieces of black board chalk. They had an absorption ratio in the 2.6 to 1 range, very slowly absorbing water and urine, and swelling in the process. The product does not maintain its basic physical size, and lost its integrity when saturated with water or urine. It did not stick to the bottom of the litter tray when saturated.

The hard texture and slow absorption rates were undesirable compared with to the first three examples. The large size and heavy density significantly reduced tracking compared with all other examples. The large hard pieces with angular ends were thought to be uncomfortable for many dogs there for adding to training difficulties. The disintegrated pellets were messy to handle and added to the tracking problem. This configuration was not preferable to other examples.

Example #6

The sixth example employed an angular silica gel based product. The product produced was similar to large rock salt in texture and color.

The particulate was in the 3/8 inches to 5/8 inches long with minimum cross sectional dimensions in excess of 5/16 inch. The product had a hard smooth outer surface with rough angular surfaces on all sides. It had a bulk density of 24 pounds per cubic foot and an absorption ratio in the 0.86 to 1 range, quickly absorbing water and urine. The product does maintain its physical size and shape when saturated. It did not stick to the bottom of the litter tray when saturated.

The hard texture and angular surfaces were undesirable compared with to the first three examples. The angular shapes and lighter density added to tracking compared with all other examples. The product appearance was clean and desirable and overall performance workable. This product did not have the best performance but it works and its unique appearance could be a strong point for the consumer. The product can be produced in a non-angular spherical form, which may overcome some of the problems caused by the angular pieces.

General Comments

An animal such as a dog does not bury their eliminations. A dog will only wipe its paws after ejecting their feces. However, this is not an action to bury the feces (or elimination), but can result in a challenge to keep the granular within a box or confinement area.

It should further be noted that the conglomerator, which is the rotating drum in the preferred embodiment, has the quality of conglomerating each individual granule. This means the granular has a smooth exterior that lacks rough acute edges that are not desirable for larger size granules. Because the granules are larger, if the exterior surface was not smooth, there is a potential that less net surface area will result upon the footing of the animal hence causing uncomfortable high-pressure zones. Of course, this is not a problem with the smaller granules because the sum of the sharp edges of the high quantity of smaller granules create a greater distributed net surface area and hence lower pressure upon the footing of an animal such as a cat. In the preferred form, the exterior of the granular substance is relatively smooth where the consistency is similar to that of paper of egg or berry crates or that of common paper product coasters for beverages.

One disadvantage of a more dense material is the absorbant ratio has a tendency to decrease. A denser bulk density can be less desirable because it is more expensive to handle and ship. However, in a broader scope of the invention a dense material that absorbs liquid and urine is desirable having a desirable absorption ratio the absorption ratio of at least 0.5 (mass of liquid over mass of material) creates desirable absorbing characteristics. Synthetic materials such as super absorbent polymers (SAPs) have been known to absorbing fifty times liquid to mass weight of absorbent and can be used manufactured to make the physical dimensions and qualities of the product described herein. The super absorbent polymers can also be added to the materials such as short waste fibers to increase the absorption ratio and maintain a bulk high-density.

The true density of the particles is generally the range between 18 percent 40 percent greater than the bulk density depending on particle shape and settling characteristics. The true density is the density of the individual granular which of course is the mass divided by the volume of the individual granule. Therefore, giving the parameters above (bulk density, aspect ratio, and size) the preferred minimum wait of the individual particles can be calculated.

It should further be reiterated that the size of the each granular piece is defined as the width between two diametrically opposed points on the particle that prevent the particle from falling through a filtering screen. In other words, a screen such as a Tyler screen having an opening width of 6 mm will define the screened content of the granular to at least have a lengthwise dimension for any given cross-sectional area of 6 mm or greater. This is also defined as the functional width. A substantial portion is defined as the substantive amount of granular material to function as recited above. Therefore, a substantial portion of granular having a width of for example, 6 mm, contains a substantial portion of granular to function as having the characteristics of not being discharged from a container holding the granular material. Of course, the end product may contain a small portion of particles that are below this functional width.

While the invention is susceptible of various modifications and alternative forms, specific embodiments thereof have been shown by way of example in the drawings and were described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

I claim:

1. A method for manufacturing large animal litter for animals producing animal discharge and elimination, the method comprising:
   a transferring a cellulose fiber material comprised in a slurry form to a de-watering apparatus,
   b conveying the cellulose fiber material into a rotating drum to round out the protruding edges and form a absorbent particulate having a functional width of greater than 6 mm and further having an aspect ratio between 1-1 and 1-6 where the bulk density is greater than 12 pounds per cubic foot to form large animal litter,
   c combining a super absorbent polymer to the cellulose fiber material,
   d passing the absorbent particulate to a dryer for removal of a portion of the moisture contained therein to form large animal litter,
   e whereas the large animal litter is operatively configured to absorb a portion of the fluid from animal discharge and elimination.

2. The process for manufacturing large animal litter for animals as recited in claim 1 where the cellulose fiber material is derived from waste short fiber from paper mills.

3. The process for manufacturing large animal litter as recited in claim 2 where the cellulose fiber material has a high organic content of greater than 50%.

4. The process for manufacturing large animal litter as recited in claim 1 where the cellulose fiber material has an adjusted pH between 4 and 5.

5. The process for manufacturing large animal litter as recited in claim 1 where following the step transferring of the cellulose fiber material to the de-watering apparatus, the material is delivered to a sizing conveyor to reduce clumped portions of the cellulose fiber material to a proper size.

6. The process for manufacturing large animal litter as recited in claim 5 where the cellulose fiber material is rolled into substantially cylindrical balls.

7. The process for manufacturing large animal litter as recited in claim 1 where pheromones are added to the cellulose fiber material.

8. The process for manufacturing large animal litter as recited in claim 1 where the bulk density of the cellulose fiber material after passing through the dryer is greater than 30 pounds per cubic foot with an absorption ratio greater than 0.84.

9. The process for manufacturing large animal litter as recited in claim 8 where the cellulose fiber material has an adjusted pH between 4 and 5.

10. A method for manufacturing animal litter for animals others than cats, comprising the steps of:
    a) retrieving raw cellulose fiber material composed in a slurry form,
    b) combining a volume of super absorbent polymer to the raw cellulose fiber material,
    c) transferring the raw cellulose fiber material to a de-watering apparatus,
    d) transferring the de-watered cellulose fiber material and passing it through a sizing conveyor and passing the sized cellulose fiber material to a rotary drum to round out the protruding edges and corners of the absorbent particulate,
    e) passing the absorbent particulate to a dryer for removal of a portion of the moisture contained therein.

11. The method as recited in claim 10 where a pheromone is added to the absorbent particulate during the process.

12. The method as recited in claim 10 where the raw cellulose fiber material has an adjusted pH between 4 and 5.

13. The method as recited in claim 10 where the cellulose fiber material is rolled into substantially cylindrical balls.

14. The method as recited in claim 10 where the cellulose fiber material is derived from waste short fiber from paper mills.

15. The method as recited in claim 10 where the bulk density of the cellulose fiber material after passing through the dryer is greater than 30 pounds per cubic foot with an absorption ratio greater than 0.84.

16. The method as recited in claim 15 where the raw cellulose fiber material has an adjusted pH between 4 and 5.

17. A product by process for manufacturing animal litter for animals others than cats, comprising the steps of:
    a) retrieving cellulose fiber material composed in a slurry form,
    b) combining a volume of super absorbent polymer to the raw cellulose fiber material,
    c) transferring the raw cellulose fiber material to a de-watering apparatus to form de-watered cellulose fiber material,
    d) transferring the de-watered cellulose fiber material and passing it through a sizing conveyor to form sized cellulose fiber and passing the sized cellulose fiber material to a rotary drum to round out the protruding edges and corners of to form a absorbent particulate,
    e) passing the absorbent particulate to a dryer for removal of a portion of the moisture contained therein.

18. The product by process for manufacturing animal litter for animals others than cats as recited in claim 17 where a pheromone is added to the absorbent particulate during the process.

19. The product by process for manufacturing animal litter for animals other than cats as recited in claim 17 where the raw cellulose fiber material has an adjusted pH between 4 and 5.

20. The method as recited in claim 19 where the bulk density of the cellulose fiber material after passing through the dryer is greater than 30 pounds per cubic foot with an absorption ratio greater than 0.84.

* * * * *